United States Patent Office 2,919,541
Patented Jan. 5, 1960

2,919,541
METHOD FOR PROPELLING ROCKETS AND ROCKET FUELS

John E. Mahan, Bartlesville, Okla., assignor to Phillips Petroleum Company, a corporation of Delaware No Drawing. Application July 6, 1953
Serial No. 366,381

39 Claims. (Cl. 60—35.4)

This invention relates to rocket fuels. In one of its more specific aspects, this invention relates to hypergolic fuels. In another of its more specific aspects, this invention relates to a method for propelling rockets.

This application is a continuation-in-part of my U.S. application, Serial No. 257,973, filed November 23, 1951, now abandoned.

My invention is concerned with new and novel rocket propellants and their utilization. A rocket or jet propulsion device, such as is discussed herein is defined as a rigid container for matter and energy, so arranged that a portion of the matter can absorb the energy in kinetic form and subsequently eject it in a specified direction. The type rocket to which my invention is particularly applied is that type rocket propulsion device designated as a "pure" rocket, i.e., a thrust producer which does not make use of its surrounding atmosphere. A rocket of the type with which my invention is concerned is propelled in response to the steps of introducing a propellant material into a combustion chamber therein, and burning it under conditions that will cause it to release energy at a high but controllable rate immediately after its entry into the combustion chamber.

Rocket propellants in liquid form are advantageously utilized inasmuch as the liquid propellant materials can be carried in a light weight, low pressure vessel and thereafter be pumped into the combustion chamber. It is thus necessary that the combustion chamber, although being strong enough to stand high pressure and temperature, need be only large enough to insure combustion. The flow of liquid propellants into the combustion chamber can be regulated at will so that the thrust resulting from continuous or intermittent bursts of power can be sustained. Intermittent burning of the fuel contributes to a longer life of the combustion chamber and of the thrust nozzle.

Various methods and liquid combinations have been found to be useful as rocket propellants. Some propellants consist of a single material, and are termed "monopropellants." Those propellants involving two materials are termed "bipropellants" and normally consist of an oxidizer and a fuel. Hydrogen peroxide and nitromethane are each well known monopropellants. Well known bipropellants include hydrogen peroxide or liquid oxygen as the oxidant with a fuel component such as ethyl alcohol-water, ammonia, hydrazine or hydrogen. Additional known bipropellants include nitric acid as the oxidizer with aniline or furfuryl alcohol as the hypergolic fuel component.

When employing 90–100 percent nitric acid, i.e., "white fuming nitric acid" as the oxidizer in a rocket bipropellant fuel, it is often necessary, dependent upon the specific fuel component, to obtain more effective ignition than would normally be obtained, by dissolving from 6 to 23 percent by weight of nitrogen dioxide in white fuming nitric acid, thereby forming "red fuming" nitric acid. A fuel component of the bipropellant type described herein is spontaneously ignited upon contacting the oxidizer. For this reason such a bipropellant material is referred to herein as being "hypergolic." A ratio of oxidizer to hypergolic fuel, based upon stoichiometric amounts, can be utilized within the limits of 0.5:1 to 1.5:1 if desired. The efficiency of combustion is less at a ratio below 1:1 and the use of the oxidizer is less economical at ratios above 1:1. However, practical consideration may necessitate the use of higher ratios, even as high as 6:1.

Each of the following objects of the invention will be obtained by the various aspects of this invention.

An object of this invention is to provide new rocket propellants. Another object of the invention is to provide a novel hypergolic fuel. Another object of the invention is to provide a method for producing immediate thrust to a rocket-type device. Another object is to provide an improved fast-burning fuel. Other and further objects will be apparent to those skilled in the art upon study of the accompanying disclosure.

In accordance with the broad aspects of this invention, I have found that organic polyamines, either in the presence or absence of normally liquid hydrocarbons form a fuel component which is highly "hypergolic" and suitable for use in the propulsion of rockets, guided missiles, and the like, in conjunction with an oxidizer. I have further found that these organic polyamines together with selected mercaptans, both more fully set forth hereinbelow, either in the presence or absence of normally liquid hydrocarbons, form a fuel component which is also highly "hypergolic" and suitable for the uses set forth above. The fuels of the present invention are composed of (1) at least one organic polyamine or mixture thereof, or (2) at least one organic polyamine or mixture thereof with at least one selected mercaptan, either of the latter components being suitable in a major or minor amount. When a selected mercaptan is used as one of the fuel constituents, it is preferred that the mixtures contain at least 10 percent of the organic polyamines and not more than 90 percent of the organic polyamines. In some instances, lesser amounts of the organic polyamine substituents can be used.

More specifically and in accordance with my invention, those organic polyamines are used which contain two or more substituent

groups attached to one or more carbon atoms wherein one or both R's is selected from the group consisting of a hydrogen atom and a hydrocarbon radical and wherein the total number of carbon atoms present in said polyamine is not greater than 30. Suitable hydrocarbon radicals (those radicals which contain only hydrogen and carbon atoms) are the alkyl, alkenyl, cycloalkyl, cycloalkenyl, aryl, alkaryl, and aralkyl radicals. The carbon atom to which the substituent

group is attached may be a cyclic (carbocyclic) carbon atom, a carbon atom of a side chain group attached to a cyclic (carbocyclic) carbon atom or a carbon atom of an acyclic molecule.

The following organic polyamines are useful in the practice of this invention: the aliphatic polyamines which include the various alkane polyamines such as 1,3-butanediamine; 1,5-diaminopentane; 1,4-diaminopentane; 3-(n-propylamino) propylamine; 1-(dimethylamino)-4-aminopentane; 1,3-propanediamine; 2,5-octanediamine; 1,5-diaminoheptane; 1,5-diaminooctane; 1,3,5-triaminooctane; 1,9-nonanediamine; 1,3,5,8-octanetetramine; 2-amino-3-

(monoethylamino) butane; guanidine; 1,2-propanediamine; N,N'-diethyl-1,4-hexanediamine; ethylenediamine; diethylenetriamine; triethylenetetramine; tetraethylenepentamine; dipropylenetriamine; tripropylenetetramine; dibutylenetriamine; di(trimethylene)triamine; tetramethylenediamine; pentaethylenehexamine; N,N,N',N'-tetraallylmethylenediamine; N,N,N',N'-tetramethylmethylenediamine; 3-isopropylaminopropylamine; 1-(diethylamino)-4-aminopentane; 3-dimethylaminopropylamine; 3-diethylaminopropylamine; N,N,N',N'-tetramethylethane-1,2-diamine; N,N,N',N'-tetramethylbutane-1,4-diamine; N,N,N',N'-tetramethylpropane-1,3-diamine; and N,N,N',N'-tetramethylpropane-1,2-diamine. Various alkenylene polyamines are also very efficient hypergolic materials and include N,N,N',N'-tetramethylpropene-1,3-diamine; N,N,N',N'-tetraallylpropene-1,3-diamine; N,N,N',N'-tetraethylpropene-1,3-diamine; N,N,N',N'-tetra(2-methylallyl)propene-1,3-diamine; N,N,N',N'-tetrocrotylpropene-1,3-diamine; N,N'-diallyl-N,N'-di(3-butenyl)propene-1,3-diamine; N,N,N',N'-tetraallyl-2-methylpropene-1,3-diamine; N,N'-diallyl-N,N'-dimethylpropene-1,3-diamine; N,N'-dicrotyl-N,N'-dipropylpropene-1,3-diamine; N,N,N',N'-tetramethyl-2-methylpropene-1,3-diamine; and the like; various aryl (aromatic) diamines and aryl polyamines such as ortho-, meta- or para-diaminobenzene; 1-methyl-2,3-diaminobenzene; 1,3,5-triaminobenzene; various alkaryl polyamines such as 1-n-butyl-3,5-diaminobenzene; 1-hexyl-2,3,4-triaminobenzene; 1-ethyl-3-diethylamino-5-aminobenzene; and various aralkyl polyamines such as 1-amino-3-(2-aminopropyl) benzene; 1,3-diamino-5[2(2-aminoethyl)-3-azapentane]-benzene; and 1,3-diamino-5[2(2-aminoethyl)-3-ethyl-3-azapentane]-benzene.

In addition to the above recited specific compounds, the total reaction mixture or fractions thereof from the preparation of N,N,N',N'-tetraallyl-, tetramethylallyl-, or tetracrotylpropene-1,3-diamine, is useful as a constituent of hypergolic fuel compositions according to the present invention. These compounds are known in the art and can be prepared by the manner described in U.S. Patent 2,565,529 by C. W. Smith, wherein a suitable alpha, beta-unsaturated aldehyde is reacted with one more secondary monoamines having attached to the nitrogen atom at least one alkenyl group with an olefinic bond in the 2,3-position relative to the hydrogen atom or by other similar methods.

Cycloalkyl polyamines and cycloalkenyl polyamines such as 1,3,5-triaminocyclohexane; 1,2-diaminocyclopentane; 3,4-diaminocyclopentene; and 1,2-diaminocyclobutane are also useful.

As indicated hereinbefore and in accordance with my invention, the amino groups of the above-described polyamines may be substituted amino groups containing the above-named hydrocarbon groups or other substituent groups containing only carbon, hydrogen and nitrogen atoms.

The fuel constituents of the present invention, i.e., organic polyamines, are hypergolic in an undiluted state and are also hypergolic when admixed with non-hypergolic materials, particularly hydrocarbons, in a state of dilution as high as 70 percent by volume of diluent when white fuming nitric acid is used as the oxidant. Suitable non-hypergolic materials which also may form a portion of the fuel composition include paraffin, cycloparffin, and aromatic hydrocarbons in the $C_5$ to $C_{30}$ range or mixture thereof, preferably the normally liquid materials. Examples of such hydrocarbon fuels are normal pentane, normal hexane, normal heptane, benzene, kerosene, isooctane, diisopropyl, diisobutylene, cyclohexene, cyclohexane, methylcyclohexane, toluene, hexadecane, eicosane, hexacosane, pentatricontane, picene, cyclononacosane, methylaltetraphenylethylene and the like. Hydrocarbons in the $C_5$ to $C_{16}$ range are preferred.

Other oxidizers are suitable oxidants for these hypergolic fuels in addition to white or red fuming nitric acid and can be used in the bipropellant fuel compositions of our invention. Suitable oxidants include materials such as hydrogen peroxide, ozone, nitrogen tetroxide, liquid oxygen and mixed acids, especially anhydrous mixtures of nitric and sulfuric acids such as 80 to 90 percent by volume of white or red fuming nitric acid and 10 to 20 percent by volume anhydrous or fuming sulfuric acid. It is within the scope of this invention to employ, preferably dissolved in the oxidizer, ignition catalysts or oxidation catalysts. These oxidation catalysts include certain metal salts, such as the chlorides and naphthenates of iron, zinc, cobalt and similar heavy materials. As an added feature of this invention the organic polyamines are also useful for providing fast burning fuels for use in rocket engines and the like wherein a hypergolic fuel is not necessarily required. For example, the fuel components of this invention are dispersed in a hydrocarbon, such as the hydrocarbon diluents described above. Even if the resulting solution is not hypergolic with an oxidant such as fuming nitric acid, it can be used together with an oxidant and a suitable igniter as a rocket propellant. These fast burning fuels are particularly useful if, for various reasons, a hypergolic fuel is not desired or required. The organic polyamines of this invention may be added to a hydrocarbon fuel in a minor amount, usually from 1 to 20 percent by volume of the total mixture to produce fast-burning fuels which are non-hypergolic. Suitable fast-burning fuels comprise from 1 to 20 percent by volume of an organic polyamide described above with 90 to 99 percent by volume of a petroleum fraction gasoline boiling range. Specifically, such a fuel can comprise between 1 and 20 percent by volume of a propenediamine and 80 to 99 percent by volume normal heptane.

As pointed out above, selected mercaptans may be used to form a portion of the hypergolic fuel constituents of this invention in admixture with the above described organic polyamines. The mercaptans which are suitable for use as such a hypergolic fuel constituent include compounds of the general formula RSH, wherein R is selected from the group consisting of alkyl and alkenyl groups containing from 3 to 10 carbon atoms. Illustrative of the mercaptans used in this invention are tert-butyl mercaptan, isopropyl mercaptan, allyl mercaptan, n-butyl mercaptan, n-hexyl mercaptan, tert-hexyl mercaptan, tert-octyl mercaptan, nonyl mercaptan, tert-decyl mercaptan, 2-butene-1-thiol, 3-butene-1-thiol, isobutyl mercaptan, and the like.

A fuel of the present invention, i.e., mixtures consisting of at least one organic polyamine and at least one mercaptan are hypergolic in an undiluted state and are also hypergolic when admixed with non-hypergolic materials, particularly those normally liquid hydrocarbons set forth above, when using such hydrocarbons in amounts as high as 50 percent by volume of hydrocarbon when white fuming nitric acid is used as the oxidant.

The invention is illustrated in the following examples. The reactants and their proportions and the specific ingredients are presented as being typical and not to be construed as unduly limiting the invention.

*Example I*

The materials described below were tested for spontaneous ignition employing fuming nitric acids as the oxidizer. In each test one part by volume of a hydrocarbon polyamine solution was dropped into a vessel containing 2.3 parts by volume fuming nitric acid. The candidate polyamine was dissolved in n-heptane or benzene so as to determine the maximum hydrocarbon dilution possible while still retaining the property of hypergolicity. Those mixtures below the maximum percentage were all hypergolic, including the undiluted polyamine itself. Tests were conducted at room temperature, about 70° F. The results are set forth below.

| Polyamine | Oxidant | Maximum Dilution, Percent Volume n-heptane or beneze |
|---|---|---|
| 1,3-butanediamine | Red Fuming Nitric Acid | 1 60 |
| Do | White Fuming Nitric Acid | 1 40 |
| ethylenediamine | Red Fuming Nitric Acid | 2 40 |
| diethylenetriamine | ------do------ | 2 10 |
| triethylenetetramine | ------do------ | 2 50 |
| tetraethylenepentamine | ------do------ | 2 45 |

1 n-Heptane diluent.
2 Benzene diluent.

*Example II*

Tests similar to those set forth in Example I were also conducted at −40° F. The results are set forth below.

| Polyamine | Oxidant | Maximum Dilution, Percent Volume n-heptane |
|---|---|---|
| 1,3-butanediamine | Red Fuming Nitric Acid | 50 |
| Do | White Fuming Nitric Acid | 50 |

*Example III*

A reaction flask fitted with thermometer, dropping funnel, reflux condenser and stirring unit was charged with a mixture of 50 grams of finely powdered anhydrous potassium carbonate, 150 grams of diethyl ether and 194 grams of diallylamine. As the mixture was stirred vigorously, 56 grams of acrolein were slowly added with cooling to maintain the reaction mixture between 10 and 15° C. (50 to 59° F.). After all the acrolein had been added, the reaction mixture was kept at 5 to 10° C. (41 to 50° F.) and stirred for 17 hours. The contents of the reactor were then filtered to remove the solid desiccant; a dark-red filtrate was recovered. The ether and low boiling components, including unreacted acrolein and diallylamine, were removed by fractional distillation. The higher boiling material was then transferred to a vacuum distillation apparatus and distilled under reduced pressure. A summary of the distillation results is presented in the following table:

| Fraction | Head Temperature, °C. | Kettle Pressure, mm. | Refractive Index at 20° C. | Wt. Grams | Wt. Percent |
|---|---|---|---|---|---|
| No. 1, Light Materials | <93 | <1 | | 97.8 | 29.2 |
| No. 2, N,N,N',N'-tetra-allylpropene-1,3-diamine | 93–105 | <1.5 | 1.4953 | 57.2 | 17.1 |
| No. 3, Unidentified heavier materials | 135–200 | >3 | 1.5182 | 27.9 | 8.3 |
| Residue | >200 | | | 152.0 | 45.4 |
| Total | | | | 334.9 | 100 |

*Example IV*

N,N,N',N'-tetraallylpropene-1,3-diamine and the other materials recovered from the fractionation of Example I were tested for spontaneous ignition employing fuming nitric acid as the oxidant. The temperature of the fuel and oxidant was maintained at room temperature (21° C.). In each test 0.13 ml. of the fuel or a diluted solution thereof was dropped into a 1″ x 8″ test tube containing 0.3 ml. of fuming nitric acid. The inert diluent (n-heptane) was employed to determine the amount of dilution which each fuel would tolerate and retain its hypergolic properties. The results are set forth in the following table.

| Fuel | Oxidant | Maximum percent Dilution with n-heptane with Retention of Hypergolicity |
|---|---|---|
| Fraction No. 1 | RFNA | 50 |
| | WFNA | 40 |
| Fraction No. 2 (N,N,N',N'-tetraallyl-propene-1,3-diamine) | RFNA | 70 |
| | WFNA | 70 |
| Fraction No. 3 | RFNA | 70 |
| | WFNA | 60 |

In addition to the room temperature tests previously described, N,N,N',N'-tetraallyl-1,3-diaminopropene and other materials recovered from the fractionation procedure of Example I were also tested for spontaneous ignition at −40° C. Prior to testing, the temperature of the fuel and oxidant was lowered to −40° C. Tests were conducted employing 0.13 ml. of fuel or a diluted solution thereof and 0.3 ml. of fuming nitric acid. Results are recorded below.

| Fuel | Oxidant | Maximum Percent Dilution with n-heptane with Retention of Hypergolicity at −40° C. |
|---|---|---|
| Fraction No. 2 (N,N,N',N'-tetraallyl-propene-1,3-idamine) | RFNA | 30 |
| | WFNA | 20 |
| Fraction No. 3 | RFNA | 40 |
| | WFNA | 10 |

In addition to the above tests, the crude reaction mixture obtained from the procedure of Example I was also tested for self-ignition properties. Prior to testing, ether and other low boiling materials were removed by heating the reaction mixture in a warm water bath under reduced pressure provided by a water aspirator. Results are recorded below.

| Fuel | Oxidant | Maximum Percent Dilution with n-heptane with Retention of Hypergolicity |
|---|---|---|
| Crude Reaction Mixture from the Run Described in Example I (Ether and low boiling materials removed). | RFNA | Not diluted. |
| | WFNA | Do. |
| Do | RFNA | 60. |
| | WFNA | 60. |

*Example V*

A run for the preparation of N,N,N',N'-tetraallylpropene-1,3-diamine was conducted in the manner described in Example I except that the reaction mixture was stirred for 12.5 hours. The reaction mixture was very dark in color and viscous. This material was distilled to remove unreacted diallylamine and other volatile materials leaving a black, plastic residue in the kettle. This material was tested for spontaneous ignition employing fuming nitric acid as oxidant. Tests were conducted with the fuel and oxidant maintained at room temperature (21° C.). In the first test, a small particle of the solid, plastic residue was dropped into 0.3 ml. of fuming nitric acid in a 1″ x 8″ test tube. In addition this residue was dissolved in n-heptane and the maximum dilution that the material would tolerate and maintain its self-ignition properties was determined. 0.13 ml. of fuel solution was employed with 0.3 ml. of fuming nitric acid as described in the test procedure of Example IV. Results are set forth below.

| Fuel | Oxidant | Maximum Percent Dilution with n-heptane with Retention of Hypergolicity |
|---|---|---|
| Plastic residue | RFNA | Not diluted. |
|  | WFNA | Do. |
| Plastic residue dissolved in n-heptane | RFNA | 50. |
|  | WFNA | 50. |

Example VI

A run for the preparation of N,N,N',N'-tetraallylpropene-1,3-diamine was conducted in the manner described in Example I except that the reaction mixture was stirred for 16 hours. After filtering off the potassium carbonate, the reaction mixture was stripped of ether. Then half of the de-etherified material was refractionated to remove everything up to diallylamine under reduced pressure (head temperature 35° C., corr.). The remaining half of this material was refractionated to remove everything up to and including diallylamine under reduced pressure (head temperature, 117° C., corr.). These two materials were tested for self-ignition properties at 21° C. and at −40° C. in the manner set forth in previous examples. Results are recorded below:

| Fuel | Test Temperature, °C. | Oxidant | Maximum Percent Dilution with n-heptane with Retention of Hypergolicity |
|---|---|---|---|
| Crude product (ether removed) | 21 | RFNA | 70 |
|  |  | WFNA | 60 |
|  | −40 | RFNA | 20 |
|  |  | WFNA | 10 |
| Crude product (ether and diallylamine removed) | 21 | RFNA | 70 |
|  |  | WFNA | 60 |
| Do | −40 | RFNA | 40 |
|  |  | WFNA | 10 |

Example VII

A drop test apparatus comprising an injection nozzle inserted to within 1″ of the bottom of a 1″ x 8″ test tube was employed to determine the ignition delay in milliseconds of N,N,N',N'-tetraallylpropene-1,3-diamine. A small quantity of fuel (0.2 ml.) was placed in the bottom of the test tube and 0.3 ml. of white fuming nitric acid was injected into the fuel. A constant pressure nitrogen surge chamber provided a source of approximately 40 p.s.i.g. pressure to inject the oxidizer into the fuel. A solenoid coil actuated the injector to provide an accurately metered amount of oxidant. The ignition delay interval was determined as the time between contact of the oxidizer with the fuel and the presence of flame as sensed by a photocell.

N,N,N',N'-tetraallylpropene-1,3-diamine was tested employing the apparatus described and was found to have an average ignition delay of 6.3 milliseconds.

This is an extremely short delay compared to known hypergolic fuels, for example, furfuryl alcohol, a known hypergolic fuel, had an ignition delay of 27 milliseconds as determined by the same apparatus and test procedure.

Example VIII

N,N,N',N'-tetramethylpropene-1,3-diamine was prepared from dimethylamine and acrolein by substantially the same procedure as previously employed for N,N,N',N'-tetraallylpropene-1,3-diamine. The crude material, in 73.8 percent yield, was distilled in an 18-inch column. A 30 percent theoretical yield of distilled product was obtained, along with 22 percent solid kettle residue.

These materials were examined for dilution data and ignition delay with the drop tester using standard techniques.

| Material | B.P., °C. | $n_D^{20}$ | Toluene Dilution | | | | Ignition Delay, milliseconds |
|---|---|---|---|---|---|---|---|
|  |  |  | Room temp. | | −40° C. | | |
|  |  |  | RFNA | WFNA | RFNA | WFNA | |
| N,N,N',N' - Tetramethylpropene-1,3-diamine | [1] 48 | 1.4589 | 70 | 70 | 10 | 10 | 15.5 @ 24° C. |
| Crude N,N,N',N'-Tetramethylpropene-1,3-diamine | | 1.4668 | 70 | 70 | 20 | 20 | 10.5 @ 24° C. |
| Plastic kettle product | | | Hypergolic | | | | |

[1] At 10.3 mm. Hg.

Example IX

Each of the fuel mixtures described hereinbelow was tested for spontaneous ignition employing fuming nitric acid as the oxidant. The temperature of the fuel and oxidant was maintained at 21° C. In each test, 0.13 ml. of the fuel or a diluted solution thereof was dropped into a 1 inch by 8 inch test tube containing 0.3 ml. of fuming nitric acid. The inert diluent was employed to determine the amount of dilution which each fuel would tolerate and retain its hypergolic properties. The results are set forth below.

| Fuel Composition | Oxidant | Maximum Percent Dilution with n-Heptane with Retention of Hypergolicity |
|---|---|---|
| 100% tert-butyl Mercaptan | Red Fuming Nitric Acid | No ignition. |
|  | White Fuming Nitric Acid | Do. |
| 10 volume percent N,N,N',N'-tetraallylpropene-1,3-diamine[1] in tert-butyl mercaptan | Red Fuming Nitric Acid | 20. |
|  | White Fuming Nitric Acid | 10. |

[1] Prepared by the run described in Example III.

Example X

A run for the preparation of N,N,N',N'-tetraallylpropene-1,3-diamine was conducted in the manner described in Example III except that the reaction mixture was stirred for 12.5 hours. The reaction mixture was very dark in color and viscous. This material was distilled to remove unreacted diallylamine and other volatile materials leaving a black, plastic residue in the kettle. A small amount of this residue was dissolved in tert-butyl mercaptan (readily soluble) and the composition so formed was tested for self-ignition properties in the manner described hereinbefore. Tests were conducted with fuel and oxidant at room temperature (21° C.). Results are recorded below.

| Fuel Composition | Oxidant | Maximum Percent Dilution with n-Heptane with Retention of Hypergolicity |
|---|---|---|
| 100 percent tert-butyl mercaptan | Red Fuming Nitric Acid | No ignition. |
|  | White Fuming Nitric Acid | Do. |
| 5 weight percent of the residue described above, dissolved in tert-butyl mercaptan. | Red Fuming Nitric Acid | 40. |
|  | White Fuming Nitric Acid | 50. |

*Example XI*

A run for the preparation of N,N,N',N'-tetraallylpropene-1,3-diamine was conducted in the manner described in Example III except that the reaction mixture was stirred for 16 hours. After filtering off the potassium carbonate the reaction mixture was stripped of ether. A portion of this material was refractionated to remove everything up to and including diallylamine under reduced pressure (head temperature, 117° C., corr.). This material was admixed with tert-butyl mercaptan in varying proportions and the fuel compositions so formed were tested for self-ignition properties by the process described in previous examples. Results are set forth below.

| Fuel Compositions | Oxidant | Maximum Percent Dilution with n-heptane with Retention of Hypergolicity |
|---|---|---|
| 100 percent tert-butyl mercaptan | Red Fuming Nitric Acid | No ignition. |
|  | White Fuming Nitric Acid | Do. |
| 10 percent crude N,N,N',N'-tetraallyl-1,3-diaminopropane (ether and diallylamine removed) | Red Fuming Nitric Acid | 20. |
|  | White Fuming Nitric Acid | 20. |

*Example XII*

Several of the alkane polyamines and alkenylene polyamines were tested for ignition delays with a drop tester, injecting white fuming nitric acid into a small quantity of fuel and determining the ignition delay interval between the contact of the acid and fuel and the presence of flame as sensed by a photocell. The materials and ignition delays are set forth below.

| Material | Ignition Delay with White Fuming Nitric Acid, Milliseconds at at 75° F. |
|---|---|
| N,N,N',N'-tetramethylmethylenediamine | 95 |
| Ethylenediamine | 93 |
| Propylenediamine | 57 |
| 1,3-Diaminobutane | 47 |
| 3-Isopropylaminopropylamine | 35 |
| 2-Amino-5-diethylaminopentane | 24 |
| 3-Dimethylaminopropylamine | 22 |
| 3-Diethylaminopropylamine | 12 |
| N,N,N',N'-Tetramethylpropane-1,3-diamine | 9 |
| N,N,N',N'-Tetramethylpropane-1,2-diamine | 6 |

*Example XIII*

Several additional alkane polyamines and alkenylene polyamines were tested for ignition delays with a drop tester, injecting white or red fuming nitric acid into a small quantity of fuel and determining the ignition delay interval between the contact of the acid and fuel and the presence of flame, as sensed by a photocell. The materials and ignition delays are set forth below.

| Material | Ignition Delay, Milliseconds, at 75° F. | |
|---|---|---|
|  | Red Fuming Nitric Acid | White Fuming Nitric Acid |
| N,N,N',N'-Tetramethylethane-1,2-diamine | 9.3 | 12 |
| N,N,N',N'-Tetramethylbutane-1,2-diamine | 14 | 16 |
| N,N,N',N'-Tetramethyl-1-butene-3,4-diamine | 4.1 | 4.6 |
| N,N,N',N',2-Pentamethylpropane-1,3-diamine | 22 | 24 |
| N,N,N',N'-Tetramethylbutane-1,4-diamine | 7.4 | 7.4 |
| N,N,N',N'-Tetramethyl-2-butene-1,4-diamine | 4.3 | 4.3 |
| N,N,N',N'-Tetramethylhexane-1,6-diamine | 8.8 | 5.3 |

As will be evident to those skilled in the art, various modifications, substitutions and changes may be made or followed in the light of the foregoing disclosure without departing from the spirit or scope of this invention.

I claim:

1. In the method for developing thrust by the combustion of bi-propellant components in a combustion chamber of a reaction motor, the steps comprising separately and simultaneously injecting a stream of an oxidant component and a stream of a fuel component into a combustion chamber of said motor, in such proportion as to produce spontaneous ignition, said fuel component consisting essentially of from 90 to 10 percent by volume of at least one mercaptan having the formula R'SH wherein R' is selected from the group consisting of alkyl and alkenyl radicals having not more than 10 carbon atoms, and from 10 to 90 percent by volume of at least one hydrocarbon polyamine containing at least two

groups attached to one or more carbon atoms, wherein each R is selected from the group consisting of a hydrogen atom and alkyl, alkenyl, cycloalkyl, cycloalkenyl, aryl, alkaryl and aralkyl hydrocarbon radicals, the hydrocarbon of said polyamine being selected from the same group of hydrocarbon radicals, and the total number of carbon atoms in said polyamine being not greater than 30.

2. A method according to claim 1 wherein said hydrocarbon polyamine is N,N,N',N'-tetramethylbutane-1,4-diamine.

3. A method according to claim 1 wherein said hydrocarbon polyamine is N,N,N',N'-tetramethylpropane-1,2-diamine.

4. A method according to claim 1 wherein said hydrocarbon polyamine is N,N,N',N'-tetramethylpropane-1,3-diamine.

5. A method according to claim 1 wherein said hydrocarbon polyamine is N,N,N'N'-tetramethylethane-1,2-diamine.

6. A method according to claim 1 wherein said hydrocarbon polyamine is N,N,N',N'-tetramethylpropene-1,3-diamine.

7. In the method for developing thrust by the combustion of bi-propellant components in a combustion chamber of a reaction motor, the steps comprising separately and simultaneously injecting a stream of an oxidant component and a stream of a fuel component into a combustion chamber of said motor, in such proportion as to produce spontaneous ignition, said fuel component consisting essentially of at least 30 percent by volume of a mixture consisting essentially of from 10 to 90 percent of at least one mercaptan having the formula R'SH wherein R' is selected from the group consisting of alkyl and alkenyl radicals having not more than 10 carbon atoms, and from 90 to 10 percent of at least one hydrocarbon polyamine containing at least two

groups attached to one or more carbon atoms, wherein each R is selected from the group consisting of a hydrogen atom and alkyl, alkenyl, cycloalkyl, cycloalkenyl, aryl, alkaryl and aralkyl hydrocarbon radicals, the hydrocarbon of said polyamine being selected from the same group of hydrocarbon radicals, the total number of carbon atoms in said polyamine being not greater than 30; and up to 70 percent by volume of a normally liquid hydrocarbon.

8. A method according to claim 7 wherein said mercaptan is tert-butyl mercaptan.

9. A method according to claim 7 wherein said mercaptan is allyl mercaptan.

10. A method according to claim 7 wherein said mercaptan is tert-hexyl mercaptan.

11. A method according to claim 7 wherein said mercaptan is isopropyl mercaptan.

12. A method according to claim 7 wherein said mercaptan is tert-octyl mercaptan.

13. A method according to claim 7 wherein said hydrocarbon polyamine is N,N,N',N'-tetramethylbutane-1,4-diamine.

14. A method according to claim 7 wherein said hydrocarbon polyamine is N,N,N',N'-tetramethylpropane-1,2-diamine.

15. A method according to claim 7 wherein said hydrocarbon polyamine is N,N,N',N'-tetramethylpropane-1,3-diamine.

16. A method according to claim 7 wherein said hydrocarbon polyamine is N,N,N',N'-tetramethylethane-1,2-diamine.

17. A method according to claim 7 wherein said hydrocarbon polyamine is N,N,N',N'-tetramethylpropene-1,3-diamine.

18. A fuel composition capable of spontaneous ignition when contacted with an oxidizer, said fuel consisting essentially of at least 30 percent by volume of a mixture consisting essentially of from 10 to 90 percent of at least one mercaptan having the formula R'SH wherein R' is selected from the group consisting of alkyl and alkenyl radicals having not more than 10 carbon atoms, and from 90 to 10 percent of at least one hydrocarbon polyamine containing at least two

groups attached to one or more carbon atoms, wherein each R is selected from the group consisting of a hydrogen atom and alkyl, alkenyl, cycloalkyl, cycloalkenyl, aryl, alkaryl and aralkyl hydrocarbon radicals, the hydrocarbon of said polyamine being selected from the same group of hydrocarbon radicals, and the total number of carbon atoms in said polyamine being not greater than 30, and up to 70 percent by volume of a normally liquid hydrocarbon.

19. A fuel composition according to claim 18 wherein said polyamine is N,N,N',N'-tetramethylbutane-1,4-diamine.

20. A fuel composition according to claim 18 wherein said polyamine is N,N,N',N'-tetramethylpropane-1,2-diamine.

21. A fuel composition according to claim 18 wherein said polyamine is N,N,N',N'-tetramethylpropane-1,3-diamine.

22. A fuel composition according to claim 18 wherein said polyamine is N,N,N',N'-tetramethylethane-1,2-diamine.

23. A fuel composition according to claim 18 wherein said polyamine is N,N,N',N'-tetramethylpropene-1,3-diamine.

24. A fuel composition according to claim 18 wherein said mercaptan is tert-butyl mercaptan.

25. A fuel composition according to claim 18 wherein said mercaptan is allyl mercaptan.

26. A fuel composition according to claim 18 wherein said mercaptan is tert-hexyl mercaptan.

27. A fuel composition according to claim 18 wherein said mercaptan is isopropyl mercaptan.

28. A fuel composition according to claim 18 wherein said mercaptan is tert-octyl mercaptan.

29. A fuel composition capable of spontaneous ignition when contacted with an oxidizer, said fuel consisting essentially of from 90 to 10 percent of at least one mercaptan having the formula R'SH wherein R' is selected from the group consisting of alkyl and alkenyl radicals having not more than 10 carbon atoms, and from 10 to 90 percent of at least one hydrocarbon polyamine containing at least two

groups attached to one or more carbon atoms, wherein each R is selected from the group consisting of a hydrogen atom and alkyl, alkenyl, cycloalkyl, cycloalkenyl, aryl, alkaryl and aralkyl hydrocarbon radicals, the hydrocarbon of said polyamine being selected from the same group of hydrocarbon radicals and the total number of carbon atoms in said polyamine being not greater than 30.

30. A fuel according to claim 29 wherein said hydrocarbon polyamine is N,N,N',N'-tetramethylbutane-1,4-diamine.

31. A fuel according to claim 29 wherein said hydrocarbon polyamine is N,N,N',N'-tetramethylpropane-1,2-diamine.

32. A fuel according to claim 29 wherein said hydrocarbon polyamine is N,N,N',N'-tetramethylpropane-1,3-diamine.

33. A fuel according to claim 29 wherein said hydrocarbon polyamine is N,N,N',N'-tetramethylethane-1,2-diamine.

34. A fuel according to claim 29 wherein said hydrocarbon polyamine is N,N,N',N'-tetramethylpropene-1,3-diamine.

35. A fuel according to claim 29 wherein said mercaptan is tert-butyl mercaptan.

36. A fuel according to claim 29 wherein said mercaptan is allyl mercaptan.

37. A fuel according to claim 29 wherein said mercaptan is tert-hexyl mercaptan.

38. A fuel according to claim 29 wherein said mercaptan is isopropyl mercaptan.

39. A fuel according to claim 29 wherein said mercaptan is tert-octyl mercaptan.

References Cited in the file of this patent

UNITED STATES PATENTS

| | | |
|---|---|---|
| 2,021,088 | Pevere | Nov. 12, 1935 |
| 2,305,676 | Chenicek | Dec. 22, 1942 |
| 2,512,297 | Biswell et al. | June 20, 1950 |
| 2,557,018 | Viles | June 12, 1951 |
| 2,573,471 | Malina et al. | Oct. 30, 1951 |

OTHER REFERENCES

Zucrow: "Journal of the American Rocket Society," No. 72, December 1947, page 32.